United States Patent Office 3,390,114
Patented June 25, 1968

3,390,114
BINDERS FOR PIGMENT DYEINGS AND PRINTS ON FIBROUS MATERIAL COMPRISING ADDITION POLYMERS CONTAINING HALOHYDRIN GROUPS AND AN EPOXY COMPOUND
Guenter Uhl, Worms (Rhine), Wolfgang Schwindt and Hans Wilhelm, Ludwigshafen (Rhine), and Gerhard Faulhaber, Mannheim, Germany, assignors to Badische Anilin- & Soda-Fabrik Aktiengesellschaft, Ludwigshafen (Rhine), Germany
No Drawing. Filed Oct. 4, 1965, Ser. No. 492,890
Claims priority, application Germany, Oct. 23, 1964, B 79,025
10 Claims. (Cl. 260—29.6)

ABSTRACT OF THE DISCLOSURE

A pigment and binder composition in which the binder contains (a) an addition polymer characterized by its essential monomeric unit of an ester of an $\alpha,\beta$-unsaturated organic acid with a polyhydric alcohol bearing halogen in vicinal position to a free hydroxyl group, and (b) a compound bearing at least two epoxy groups in the molecule. This composition can be applied to fibrous material, e.g. cellulosic textiles, in a conventional manner and then cured to provide useful pigment dyeings or prints. As one example, the binder may include (a) a copolymer of the acrylic type containing as the essential monomeric unit 10% by weight of 2-hydroxy-3-chloropropyl acrylate, and (b) butanediol diglycidyl ether.

---

This invention relates to new binders for pigment dyeings and prints on fibrous material by the methods, known per se, of pigment dyeing or pigment printing by means of curable (crosslinkable) macromolecular substances as binders and a basic curing catalyst. The invention furthermore relates to the method of producing the pigment dyeings and prints.

It is known from German patent specification No. 1,140,898 to use for the said purpose aqueous dispersions of polymers bearing halohydrin groups in the side chains. These polymers are crosslinked onto the fibrous material at elevated temperatures with basic reagents, if desired together with a resin capable of basic fixation.

It is also know that polymers containing carboxy, acid amide, hydroxy or amino groups may be crosslinked with epoxy compounds as crosslinking agents.

We have now found, surprisingly, that particularly outstanding results are obtained in the pigment dyeing or pigment printing of fibrous materials by conventional methods when the binder contains: (a) a polymer bearing halohydrin groups in side chains and (b) a compound having at least two epoxy groups in the molecule.

Suitable polymers bearing halohydrin groups in side chains are for example those obtained from esters of (i) $\alpha,\beta$-unsaturated organic acids, such as acrylic acid or methacrylic acid and (ii) polyhydric alcohols which bear halogen, preferably chlorine, in vicinal position to a free hydroxyl group. The following are examples of alcohol components in these monomers: 3-chloropropanediol-1,2, 2,3 - dichlorobutanediol - 1,4, 3-chlorobutanetriol-1,2,4, 1,4 - dichlorobutanediol - 2,3, 3-chloro-2-methylpropanediol-1,2 and 3 - chloro - 2 - chloromethylpropanediol - 1,2. Among the polymerizable derivatives of these compounds, 2-hydroxy-3-chloropropyl acrylate is of particular industrial interest because it is cheap and readily available.

As a rule it is not homopolymers of monomers containing halohydrin groups which are used, but rather copolymers thereof with other monomers, for example vinyl esters, such as vinyl propionate; acrylic and methacrylic acid esters, such as the methyl, ethyl, propyl and butyl esters; hydrocarbons, such as butadiene; and also for example maleic esters, fumaric esters, vinyl ethers, vinyl ketones, styrene, vinyl chloride, vinylidene chloride and acrylonitrile. Minor amounts of water-soluble monomers, such as acrylic acid, acrylamide and vinylpyrrolidone, may also be used to modify the chemical properties.

These copolymers (which as a rule should be soft and elastic at room temperature to suit the application) are known per se and may be prepared by conventional methods, preferably by emulsion polymerization using conventional assistants, such as polymerization initiators, emulsifiers and protective colloids. The proportion of monomers containing halohydrin groups is advantageously from about 0.5 to 30%, preferably 5 to 15%, by weight.

Examples of suitable compounds containing at least two epoxy groups in the molecule (hereinafter briefly referred to as epoxy compounds) are all compounds of (i) at least bifunctional alcohols, such as glycol; glycerol; butanediol; pentaerythritol; diphenylolmethane; diphenylolpropane-2,2; 4,4'-dihydroxycyclohexylmethane; 4,4'-dihydroxycyclohexylpropane-2,2, and (ii) epihalohydrine, such as above all 1,2-epoxy-3-chloropropane (epichlorohydrin). Examples of compounds of this type are butanediol diglycidyl ether and glycerol triglycidyl ether and preferably low adducts of compounds of the said type, so-called epoxy resins, and the degree of polyaddition of these resins should be equivalent to epoxy numbers of up to about 0.2. 1,2,3,4-diepoxybutane may be given as another epoxy compound.

To prepare the finished agent for dyeing and printing, 1 part by weight of the polymer containing halohydrin groups or a dispersion of this polymer is mixed with 0.025 to 0.5 part by weight of the epoxy compound and with the desired amount of pigment, normally about 0.05 to 2.0 parts by weight, and any other conventional assistants, for example with basic agents which effect a cure of the binder mixture at elevated temperatures. To obtain the necessary viscosity, thickeners having a high solid content and/or oil-in-water or water-in-oil emulsions may be added to the print pastes used for printing.

All insoluble dyes or dyes which are insoluble in the particular system used, and also black pigments and white pigments are suitable as pigments. The success of the process does not appear to be dependent on the type of pigment.

For curing (crosslinking) the binder mixture it is preferable to use basic compounds, such as caustic alkali solutions, ammonia, or organic amines, for example triethanolamine. If the basic compound is sufficiently slow to react at normal temperature in the chosen binder system, it may be added to the dye or print mixture from the start or shortly before the dyeing or printing process. Curing of the binder, which is synonymous with fixation of the pigment, then takes place in the conventional way after the dye or print agent has been applied to the fibrous material, if necessary after intermediate drying, at elevated temperatures, for example at 40° to 60° C.

Where more reactive systems are concerned, potentially basic substances (i.e. compounds which split off basic compounds only at the fixing temperature, i.e. at or above 100° C.) are added to the dye liquors or print pastes. Alternatively the basic curing agent may be allowed to act on the dyed or printed goods after they have been dyed or printed and given an intermediate drying, in a second operation, the fixation following by a conventional method. Curing of the binder system according to this invention may also be effected with satisfactory results at elevated temperatures without adding basic curing catalysts as well as in the presence of acid agents or potentially acid compounds.

An industrially important variant of the process according to this invention for printing consists in the employment, in addition to the pigment, of vat dyes, sulfur dyes and/or reactive dyes, and in finishing the prints in a conventional way on cellulosic fibrous material by the two-phase printing method.

The binders according to this invention are outstandingly suitable for dyeing or printing natural or viscose materials or synthetic organic fibrous material, particularly cellulosic material, such as cotton or staple fiber, or polypropylene fibrous material, and particularly for dyeing glass fabrics. In the lastmentioned case it is advantageous, in a manner per se, to use coupling agents, for example organosilicon compounds, such as aminosilanes.

Contrasted with the binders known from German patent specification No. 1,140,898, the binders according to this invention are distinguished not only by the fact that by using them to achieve the same effects, milder fixing conditions are required, but particularly that dyeings and prints obtained therewith have greater tinctorial strength and are more level.

The invention is further illustrated by the following examples in which parts and percentages are by weight.

Example 1

A cotton cloth is printed on a roller printing machine with a print paste of: 200 parts of an about 40% aqueous dispersion of a copolymer of 59% of butyl acrylate, 15% of methyl methacrylate, 15% of acrylonitrile, 1% of acrylic acid and 10% of 2-hydroxy-3-chloropropyl acrylate; 50 parts of an about 35% aqueous paste of copper phthalocyanine pigment; 670 parts of a thickener emulsion which has been obtained by stirring 78% of white spirit having a boiling range of 140° to 220° C. into a solution of 1% of the adduct of 25 moles of ethylene oxide to 1 mole of sperm oil alcohol and 0.25% of sodium alginate in 20.75% of water by means of an impeller at about 3000 r.p.m.; 50 parts of butanediol diglycidyl ether and 30 parts of triethanolamine, the cloth is dried at about 50° C. and steam for eight minutes at 102° C. A blue print having good fastness is obtained.

Example 2

A union cloth of cotton and polyester is printed by screen printing with a print paste of: 150 parts of an about 40% aqueous dispersion of a copolymer of 20% of butadiene, 40% of isobutyl acrylate, 25% of acrylonitrile and 15% of 2,3-dichloro-4-hydroxybutyl methacrylate; 30 parts of an about 35% aqueous titanium dioxide pigment paste; 740 parts of the thickener emulsion according to Example 1; 40 parts of an epoxy resin having a mean epoxy value of 0.3 and obtained from diphenylolpropane-2,2 and epichlorohydrin and 40 parts of an about 25% aqueous solution of potassium bicarbonate, the cloth is dried at about 50° C. and heated for two minutes with hot air at 180° C. A white print having good fastness is obtained.

Example 3

A printing binder is prepared from: 250 parts of the binder dispersion according to Example 1; 10 parts of the adduct of 20 moles of ethylene oxide to 1 mole of tallow alcohol; 3 parts of tragacanth and 87 parts of water by stirring in 650 parts of white spirit as in Example 1.

Staple fiber cloth is printed on a roller printing machine with a print paste of: 920 parts of the said printing binder; 10 parts of pentaerythritol triglycidyl ether; 30 parts of the diamide of propylene diamine and dehydrated ricinoleic acid and 40 parts of an about 35% aqueous paste of a blue anthraquinone dye pigment, dried at about 50° C. and fixed with hot air at 140° C. for five minutes. A print having good fastness is obtained.

Example 4

A cotton cloth is printed on a roller printing machine with a print paste of: 200 parts of an about 40% aqueous dispersion of a copolymer of 50% of butyl acrylate, 35% of styrene and 15% of 2-hydroxy-3-chloropropyl acrylate; 50 parts of an about 30% aqueous paste of a yellow azo dye pigment; 700 parts of the thickener emulsion according to Example 1 and 50 parts of butanetriol triglycidyl ether, dried at about 50° C. and steamed for ten minutes at 1.5 atmospheres gauge. A print having good fastness is obtained.

Example 5

A staple fiber cloth is printed on a roller printing machine with a print paste of: 200 parts of the binder dispersion according to Example 1; 40 parts of an about 35% paste of carbon black; 690 parts of a thickener emulsion which has been obtained by stirring 72% of white spirit having a boiling range of 140° to 220° C. by means of an impeller at about 3000 r.p.m. into a solution of 1% of the sodium salt of the acid sulfuric acid ester of the adduct of 80 moles of ethylene oxide to 1 mole of sperm oil alcohol, 0.4% of carboxymethyl cellulose in 26.6% of water; 50 parts of pentaerythritol triglycidyl ether and 20 parts of tartaric acid, dried at about 50° C. and fixed with hot air at 140° C. for five minutes. A print having good fastness is obtained.

Example 6

150 parts of the binder dispersion according to Example 1 and then, by means of an impeller at about 3000 r.p.m., 645 parts of white spirit having a boiling range of 140° to 220° C. are stirred into a solution of: 10 parts of the adduct of about 25 moles of ethylene oxide to 1 mole of tallow alcohol; 15 parts of glycerol and 40 parts of an about 7% aqueous solution of carboxymethyl cellulose in 140 parts of water.

Glass fabric, pretreated in the usual way, is printed by screen printing with a print paste of: 889 parts of the above emulsion; 30 parts of an about 35% paste of a red anthraquinone dye pigment; 25 parts of triethanolamine, 50 parts of glycerol triglycidyl ether and 6 parts of an aminosilane having the formula:

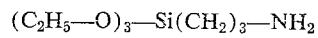

$$(C_2H_5-O)_3-Si(CH_2)_3-NH_2$$

dried at about 50° C. and fixed at 150° C. with hot air. A print having good fastness is obtained.

Example 7

A binder is prepared from: 250 parts of the binder dispersion according to Example 2; 5 parts of the adduct of 25 moles of ethylene oxide to 1 mole of sperm oil alcohol; 30 parts of glycerol; 100 parts of a 6% aqueous tragacanth solution and 100 parts of water by stirring in 515 parts of white spirit according to Example 1. 900 parts of this binder, 50 parts of pentaerythritol triglycidyl ether and 50 parts of a 50% aqueous titanium dioxide paste are mixed to prepare a print paste.

Another print paste is prepared from: 50 parts of red vat pigment (Color Index No. 67,000); 250 parts of water and 700 parts of a thickener of starch ether, carob bean flour ether and water necessary for adequate viscosity.

Cotton cloth is printed by screen printing sucessively with the pigment print paste and the vat print paste, part of the two prints overlapping. The cloth is then dried and padded with a liquor containing per liter 65 g. of the sodium salt of 75% α-nitrilotriethanesulfinic acid, 70 g. of caustic soda solution of 38° Baumé, 50 g. of sodium carbonate and 15 g. of borax. While the cloth is still damp it is steamed for thirty seconds at about 115° to 120° C., then rinsed cold and hot, soaped, rinsed again and dried. Beside the red vat print there is obtained a white print and a vat print dulled by the white print underneath it, all exhibiting excellent fastness.

Example 8

Cotton cloth is padded with a dye liquor of: 12 parts of an about 35% paste of a yellow azo dye pigment; 100 parts of the binder dispersion according to Example 1; 10 parts of triethanolamine; 20 parts of glycerol triglycidyl ether; 20 parts of an about 6% aqueous tragacanth solution and 838 parts of water, dried at about 50° C. and fixed with hot air at 140° C. for five minutes. A dyeing having good fastness is obtained.

We claim:

1. A pigment and binder composition for the production of pigment dyeings and prints on fibrous material, said binder containing
    (a) an addition polymer in which the essential monomeric unit is an ester of an $\alpha,\beta$-unsaturated organic acid with a polyhydric alcohol bearing halogen in vicinal position to a free hydroxyl group, and
    (b) a compound bearing at least two epoxy groups in the molecule.

2. A binder as claimed in claim 1 in which the polymer (a) is an aqueous emulsion copolymer of 0.5 to 30% by weight of an acrylic acid ester or a methacrylic acid ester which contains a halohydrin group in the ester radical and 99.5 to 70% by weight of one or more other comonomers.

3. A binder as claimed in claim 1 wherein compound (b) is a curable epoxy resin.

4. A binder as claimed in claim 1 wherein 0.025 to 0.5 part by weight of compound (b) is used for 1 part by weight of polymer (a).

5. A process for the production of pigment dyeings or pigment prints on fibrous material by means of crosslinkable polymers as binders in a conventional manner by curing the polymer on the fibrous material, wherein a binder as claimed in claim 1 is used.

6. A process as claimed in claim 5 wherein a vat, sulfur or reactive dye is used in addition to the pigment.

7. A process as claimed in claim 5 wherein the fibrous material is a cellulosic material.

8. A process as claimed in claim 5 wherein the fibrous material consists of glass fibers.

9. A process as claimed in claim 8 wherein a coupling agent is used.

10. Pigment dyeings and pigment prints when obtained by the process claimed in claim 5.

References Cited

UNITED STATES PATENTS 2,933,416  4/1960  Hoakh et al. _____ 260—29.6

FOREIGN PATENTS 1,233,190  10/1960  France.
1,140,898  7/1963  Germany.

MURRAY TILLMAN, *Primary Examiner.*

W. J. BRIGGS, *Assistant Examiner.*

UNITED STATES PATENT OFFICE
CERTIFICATE OF CORRECTION

Patent No. 3,390,114                          June 25, 1968

Guenter Uhl et al.

It is certified that error appears in the above identified patent and that said Letters Patent are hereby corrected as shown below:

Column 3, line 13, after "in a manner" insert -- known --.

Signed and sealed this 16th day of December 1969.

(SEAL)
Attest:

Edward M. Fletcher, Jr.                WILLIAM E. SCHUYLER, JR.
Attesting Officer                         Commissioner of Patents